(12) United States Patent
Dureja

(10) Patent No.: US 9,642,186 B1
(45) Date of Patent: May 2, 2017

(54) STEALTH WIRELESS POLE SYSTEM AND PLATFORM

(71) Applicant: Manish K. Dureja, Owings, MD (US)

(72) Inventor: Manish K. Dureja, Owings, MD (US)

(73) Assignee: DAS WORLDWIDE, Washington, DC (US)

( * ) Notice: Subject to any disclaimer, the term of this patent is extended or adjusted under 35 U.S.C. 154(b) by 0 days.

(21) Appl. No.: 15/001,677

(22) Filed: Jan. 20, 2016

(51) Int. Cl.
*H04M 1/00* (2006.01)
*H04W 88/10* (2009.01)

(52) U.S. Cl.
CPC .............. *H04W 88/10* (2013.01); *H04M 1/00* (2013.01)

(58) Field of Classification Search
CPC ........... H04W 88/10; H04M 1/00; H04B 1/38
USPC ............................ 455/561; 375/220; 343/702
See application file for complete search history.

(56) References Cited

U.S. PATENT DOCUMENTS

| | | | | |
|---|---|---|---|---|
| 2003/0164763 A1* | 9/2003 | Hisano | .................. | G08B 13/181 340/539.13 |
| 2004/0198453 A1* | 10/2004 | Cutrer | .................. | H04W 88/08 455/562.1 |
| 2008/0100707 A1* | 5/2008 | Brown | .................. | G08B 13/196 348/158 |
| 2012/0101729 A1* | 4/2012 | Cho | .................. | G01V 1/008 702/2 |
| 2012/0133510 A1* | 5/2012 | Pierce | .................. | H04Q 1/026 340/540 |
| 2014/0240139 A1* | 8/2014 | Tapley | .................. | G09B 21/00 340/815.4 |
| 2015/0035704 A1* | 2/2015 | Schwengler | ......... | H01Q 1/2291 343/702 |
| 2015/0070221 A1* | 3/2015 | Schwengler | ............. | H01Q 1/04 343/702 |

FOREIGN PATENT DOCUMENTS

CN                204391502     * 10/2015   ............... H02B 1/04

* cited by examiner

Primary Examiner — Mong-Thuy Tran
(74) Attorney, Agent, or Firm — Maxvalueip LLC

(57) ABSTRACT

In one example, we describe a Stealth Wireless Pole System and Platform. In one example, we describe a system which: Accommodates all antennas, electrical power, fiber backhaul, e.g., to support up to 4 or 5 wireless service providers; Provides Wi-Fi and/or backhaul services managed by our company; Hides all equipment from view in a complete stealth design; Meets most or all zoning and planning, and permitting requirements for telecommunications facilities; Increases wireless capacity and coverage, including for public safety; Enables the Internet of Things environment by enabling device and service integration. Here, one can save money and resources by integrating all the functionalities and multiple carriers in one platform. Other variations and examples are also given here.

17 Claims, 9 Drawing Sheets

STEALTH WIRELESS POLE SYSTEM AND PLATFORM

BACKGROUND OF THE INVENTION

Usage on mobile networks is exploding. The total demand for mobile and data services is surpassing the available capacity, causing networks to become congested and fail. Now and over the next few years, capacity is and will be augmented through the use and deployment of additional wireless data standards and facilities, such as Wi-Fi, LTE-U and Small Cell wireless base station (cell site) equipment in large metropolitan, suburban, and rural areas. However, the concentrated deployment and installation of such equipment in a small area in cities or towns is not aesthetically pleasing, nor is practical for such equipment to be ubiquitously deployed or installed without consideration of costs to operate or impact on the community and environment.

Our solution is Stealth Wireless Pole System and Platform, shown below. The invention and embodiments described here, below, have not been addressed or presented in any prior art.

SUMMARY OF THE INVENTION

In one embodiment, we describe stealth wireless poles. An architecture developed to provide the capacity and coverage needs of wireless users in the present and future and enable wireless carriers to share infrastructure via a neutral-host solution, will have the following spec, as an example:

- Accommodates e.g. up to 5 wireless service providers
- Provides e.g. Wi-Fi and/or backhaul services, managed by DAS Worldwide, our company
- Hides and shields all equipment from view in a complete stealth design, e.g., against electromagnetic radiation, hackers, jamming, interference, or noise
- Meets most zoning and planning, and permitting requirements for telecommunications facilities
- Increases wireless capacity and coverage, including for public safety
- Accommodates the Internet of Things, "IoT" by enabling devices and services interconnection
- Saves money and resources by integrating all functionalities required to service multiple carriers into a single platform, with many technical and cost-sharing/saving advantages due to our unique design and components, mentioned below.

BRIEF DESCRIPTION OF THE DRAWINGS

FIG. 2 is for one embodiment, as an example, for our platform system, for pole installed in ground or on it or on a plate or slab or surface or structure or the like.

DETAILED DESCRIPTION OF THE PREFERRED EMBODIMENTS

Figure 1:
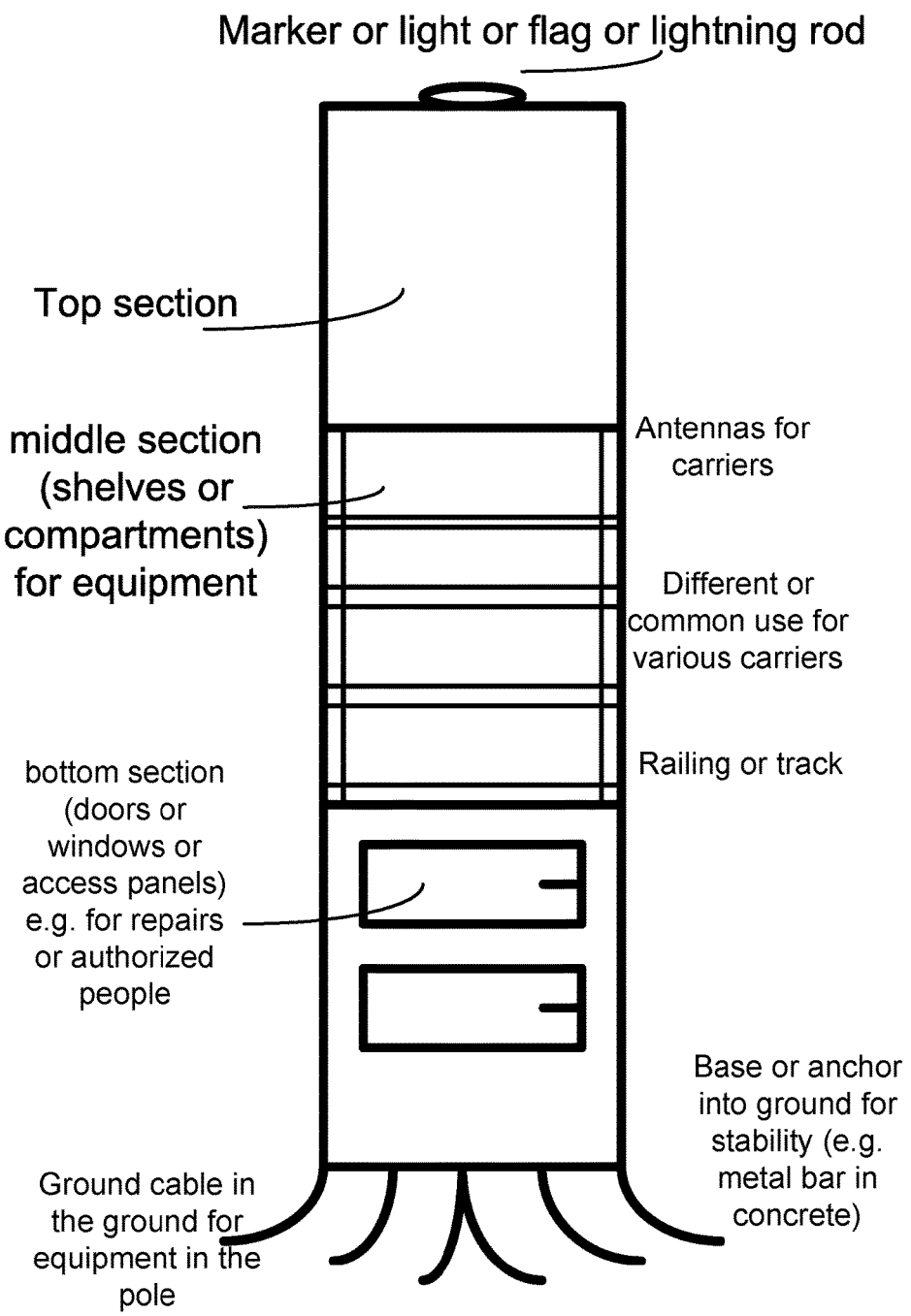
FIG. 1 is for one embodiment, as an example, for our platform system, for pole (or pipe structure or shape) with various sections and components. Also, see Appendices 1-5 for more details.

Here are some embodiments, addressing the Stealth Wireless Pole (or "Smart Pole") Electrical and Structural Components and Considerations:

A dedicated section of the pole is designed to contain electrical power metering equipment of the local power utility, with the ability of the utility to read, either visually, or electronically, power usage data by, or without, opening the pole. Here are the key points for electrical components:

- A utility approved metering device that can be read through the metal enclosure around the bottom of the pole, either visually or electronically.
- A Utility-approved breaker box
- An electrical breaker box with an integrated single-gain "courtesy outlet".
- A power supply with sufficient capacity to support all equipment mentioned here in this disclosure, in any combinations.
- Multiple radio heads, e.g., 4 or 5 units.
- Support for multiple wireless operators or service providers, e.g., radio heads and Small Cell base stations.
- Power Distribution gear.
- Common Grounding Bar and common "bus-bar" all the way up the pole.
- Conduit and/or other electrical raceways for running DC power and grounding to the top of the pole.
- Any additional power distribution equipment, or PLCs as may be appropriate.
- "Smart" power monitoring equipment.
- Other power requirements as necessary to receive municipal Department of Transportation approval for a street side pole.
- Any alternative back-haul or front-haul possibilities for dense metro pole deployments and C-RAN necessities such as microwave or copper.

Here are the key points for structural components:

- Key structural requirements needed/used to receive municipal Department of Transportation approval for a street side pole.
- Key structural requirements for the bottom 6 feet to accommodate all of the head-end power equipment, including protection for a possible small battery backup unit.
- Supported wind load ratings.
- To protect against RF degradation due to wind and other pole vibration events with our current small cell design goals.
- Material used for the top half of pole that needs to be able to be penetrated by RF.

The pole may be internally anchored into foundation, or anchoring occurs outside. For all internal anchoring, there is space in the base of this pole.

A custom designed base cover for the anchors.

Workers accessing the various compartments of the pole. That is, any kind of hooks, pegs, etc., into pole for workers accessing, or requirements for them to use ladders, bucket truck, etc. to reach to top of the pole.

The crash rating and the key metrics for high-crash locations, when deciding on pole placements.

Internally bolster and protect the most important and expensive components inside of the pole, to protect in case of a crash, earthquake, high-wind event, or other disasters.

The ability to incorporate some type of breakaway device or impact absorption techniques to cut down on overall pole damage/crushing in the event of a crash event.

Each of the main components inside of the pole is either IP67 or IP30 "Ingress Protection" rated, as an example of environmental protection of components within the pole against heat, cold, dust, wind, rain, etc.

Waterproofing everything, including all access doors and joints, or other components and systems or circuitry.

Protect against corrosion over time, and the average lifespan of these metals.

In one embodiment, we have a pole structure approximately 30 feet high. In one embodiment, we have a steel pole of 12.5 feet high, with 18" diameter. In one embodiment, we have a structure with multiple doors and windows for access and signal transmission. In one embodiment, we have power lines, cables, fiber optics, wireless signal, antennas, optical signals, lasers, low voltage line, high voltage line, Internet connectivity, secure lines, secure network, or private network, coming to the pole, or connected or distributed or amplified or monitored or characterized or tested, via pole or through pole.

In one embodiment, we have 3 sections for the pole: top section, middle section, and bottom section. In one embodiment, we have the middle section with shroud and shelves, including antennas for multiple carriers and antenna for our own organization, e.g., for Wi-Fi and/or remote management services. In one embodiment, we have a Metro sign or streetlight or tree shape or statue or figurine or flagpole, to hide or disguise or decorate the pole. In one embodiment, we have different number of access doors and windows on the structure, with different sizes, for repair, inspection, monitoring, installation, upgrades, or testing, which, e.g., gives access to 4 carriers, each for access to its own antenna and devices, separately (or with a common door), with lock or password or biometrics or smart card or badge or RFID or camera, to open or access the door or content.

In one embodiment, we install smart meters or other diagnostic devices, or solar cells plus batteries or sensors or meters or conversion equipment or formatting equipment or security devices or recording devices or optimizing devices or anti-hacking devices or physical security devices or electronic security devices. In one embodiment, we install or upgrade the software or hybrid of hardware/software. In one embodiment, we use metal for/in the pole, or concrete, or fiberglass, or a RF-friendly material, or glass, or wood, or plastic, or alloy, or metal shield, or RF-shield, or signal blocking shield, or signal transmitting material.

In one embodiment, we have heating and/or cooling in the pole. In one embodiment, we have fan for air circulation. In one embodiment, we have insulators for temperature control in the pole. In one embodiment, we have temperature controller device for adjusting temperature in the pole. In one embodiment, we have water-proof material on the gaps and doors to seal and protect the equipment inside the pole.

Appendix 1 shows various styles and shapes for structure of the pole. Appendix 2 shows various styles and shapes for structure of the pole. Appendix 2 also shows a pole structure with 3 sections: top section, middle section (with shelves, shroud, shroud clips, to attach and lock, 2 shroud halves, grooves along the steel frame sliding into the shroud for a more secure fit, and space for holding equipment and antennas for various carriers), and bottom section (with doors, access panels, and windows, with locks and secure means, to limit access to authorized people and only related companies, for various equipment, e.g., power supplies, routers, network switches, network monitoring devices, smart meters, converters, adaptors, packet analyzers, batteries, solar energy devices, surge protectors, and the like). It can accommodate, e.g., 5 wireless service providers. It can shield all equipment. It reduces planning and zoning applications by consolidation, to reduce cost. It increases wireless capacity and coverage for public safety. It enables the Internet of Things (IoT).

Appendix 3 shows a fan installed on top of the bottom section of the pole system/platform/structure, as an example, to circulate the air, for cooling the system or for uniform/equal temperature across the pole length.

Appendix 4 shows, as an example, a smart pole's top-to-bottom bill of materials, with various spec and components for various sections, with their parameters and ratings and locations, within the pole structure, as well as examples of manufacturer and model number, plus height, width, depth, volume, weight, voltage, and power values, plus operating temperature, IP rating, mount, MIMO capabilities, users information, output power, antenna type, bands, technologies used, output (Power Over Ethernet) POE power, Wi-Fi information, mounting location, model description, power and electric head-end equipment, Ethernet ports, and fiber ports information or data.

Appendix 5 (pages 1-2) shows various styles and shapes for structure of the pole. Appendix 5 also shows 3D frontal view (page 3) and 3D view of shroud attachment (page 4), with various shelves and doors or windows, with transparent, translucent, or opaque material, e.g., glass, plastic, metal, wood, fiber, or concrete. Appendix 5 (page 5) also shows various components inside pole, instead of shelves. Appendix 5 (pages 6-8) also shows stealth infrastructure design with Metro sign on it.

Appendix 5 (page 9) shows back view with the shroud attached. The diameter of the pole is 18", for example, with the shroud attached, and, e.g., 17", without the shroud or jacket. Each door has an individual built-in lock or security entrance module. The middle section is about 10', for example, in length. It also shows the bottom of shroud attachment with doors, covers, caps, or access panels. It also shows the foundation with components, e.g., concrete, base, legs, support, armored and reinforced section, and anchor, for stability of the pole. The length of the pole could be between typical 1'-50' for various applications and locations, with diameter from 1" to 4', as circle or rectangle or triangle or square cross sections.

Appendix 5 (page 9) also shows back view without the shroud attached. It shows e.g. 27' length of the whole pole. It shows removing the shroud exposes a hollow steel frame, which also acts as a cabling track and provides additional structural integrity. Appendix 5 (page 10) shows back views with and without the shroud attached. It shows e.g. 27' length of the whole pole. It shows removing the shroud exposes a hollow steel pipe, which also acts as a cabling track and provides additional structural integrity, as a variation of the Figure on Page 9.

Appendix 5 (page 11) shows top section without the shroud, with 3" spacers, e.g., to separate each carrier compartment. It also shows hollow steel cabling frame. In each carrier compartment, the sides of the frame include a 110V receptacle and a fiber/Ethernet jack. It also shows the carrier compartments with an Alcatel Lucent B4 RRH2x60-4R installed, as an example.

Appendix 5 (page 12) shows top section without the shroud. It also shows hollow steel tube runs down the infrastructure. It acts as a cabling track and a structure for mounting the carrier radios. It also shows the carrier radios, as an example.

Appendix 5 (page 13) shows another view of the pole, with an antenna, or a pseudo-omni antenna installed, for the single antenna shared by multiple carriers. Appendix 5 (page 14) shows bottom section of infrastructure for a pole, with, e.g., DAS Worldwide Network & Monitoring, Carrier #1—Core Equipment, Carrier #2—Core Equipment, Carrier #3—Core Equipment, Carrier #4—Core Equipment, Electric Utility Access, and Telecom & Power Street Access, with dimensions shown, as typical values. It also shows base support in the ground, with anchors, and corresponding dimensions, e.g., 3' depth.

Appendix 5 (page 14) shows some examples: All carrier doors are 1" apart. The DAS Worldwide door is 3" above the carrier #1 door. The Telecom & Power Street Access is 3" above the ground. The Electric Utility Access is 2" above the Telecom & Power Street Access.

Appendix 6 (pages 1-2) shows the poles with Metro sign, separate and integrated, in the street. Appendix 6 (page 3) shows front 3D view. Appendix 6 (page 4) shows 3D view of shroud attachment. Appendix 6 (page 5) shows 3D view of shroud attachment with radios installed. Appendix 6 (page 6) shows back view with the shroud attached, and back view without the shroud attached. Appendix 6 (page 7) shows outdoor antenna installed for single antenna shared by multiple carriers. Appendix 6 (page 8) shows the fans installed for air circulation. Appendix 6 (page 9) shows the bottom half with all the devices and components as shown, e.g., network and monitoring devices.

Note that the emphasis for Appendix 5 is shelves for the equipment, but Appendix 6 emphasizes the attachments of the equipment on or at the inner pole and shaft or column. Appendix 7 (pages 1-3) teaches the flag pole with different variations, integrated for our system.

Appendix 8 (pages 1-2) shows the street examples for the poles. Appendix 8 (page 3) shows 3D view of the shroud attachment with antenna on top and two doors or jackets or covers. Appendix 8 (page 4) shows 3D view of the shroud attachment with radios installed. Appendix 8 (page 5) shows 3D view of the back view with the shroud attached (on left side), and also, without the shroud attached (on right side). Appendix 8 (page 6) shows the antenna and carrier radios. Appendix 8 (page 7) shows the fans for air circulation. Appendix 8 (page 8) shows the bottom half with core equipment for carriers, as well as utility access and telecom access, with examples of distances.

Here is one embodiment: A system for wireless pole platform for installation in or on a city or rural area, building, road side, transportation station, park, or platform, said system comprising: a top section; a middle section; a bottom section; wherein said middle section comprises shelves to hold equipment from one or more carriers, with antenna; wherein said bottom section comprises one or more doors and windows as access panel for repair, testing, installation, calibration, measurements, or maintenance; wherein said bottom section is attached to ground for stability, with following options or features:

wherein said one or more doors and windows are waterproof.
wherein said one or more doors and windows are secured.
wherein said one or more doors and windows are monitored by a center.
wherein said one or more doors and windows are customized for each carrier.
wherein said one or more doors and windows are locked.
wherein said one or more doors and windows are secured by biometrics modules.
said system comprises a heating unit.
said system comprises a cooling unit.
said system comprises a fan unit.
said system comprises insulation for heat transfer.
said system comprises insulation for sound or noise transfer.
said system is stealth for view by a decoration or paint or color or shape.
said system comprises a camera.
said system comprises a password module.
said system comprises a warning module for pole owner or police.
said system comprises an anti-hacking module.
said system comprises a temperature controller.
said system comprises one or more sensors.
said system comprises a calibration or testing device.

Figure 2:
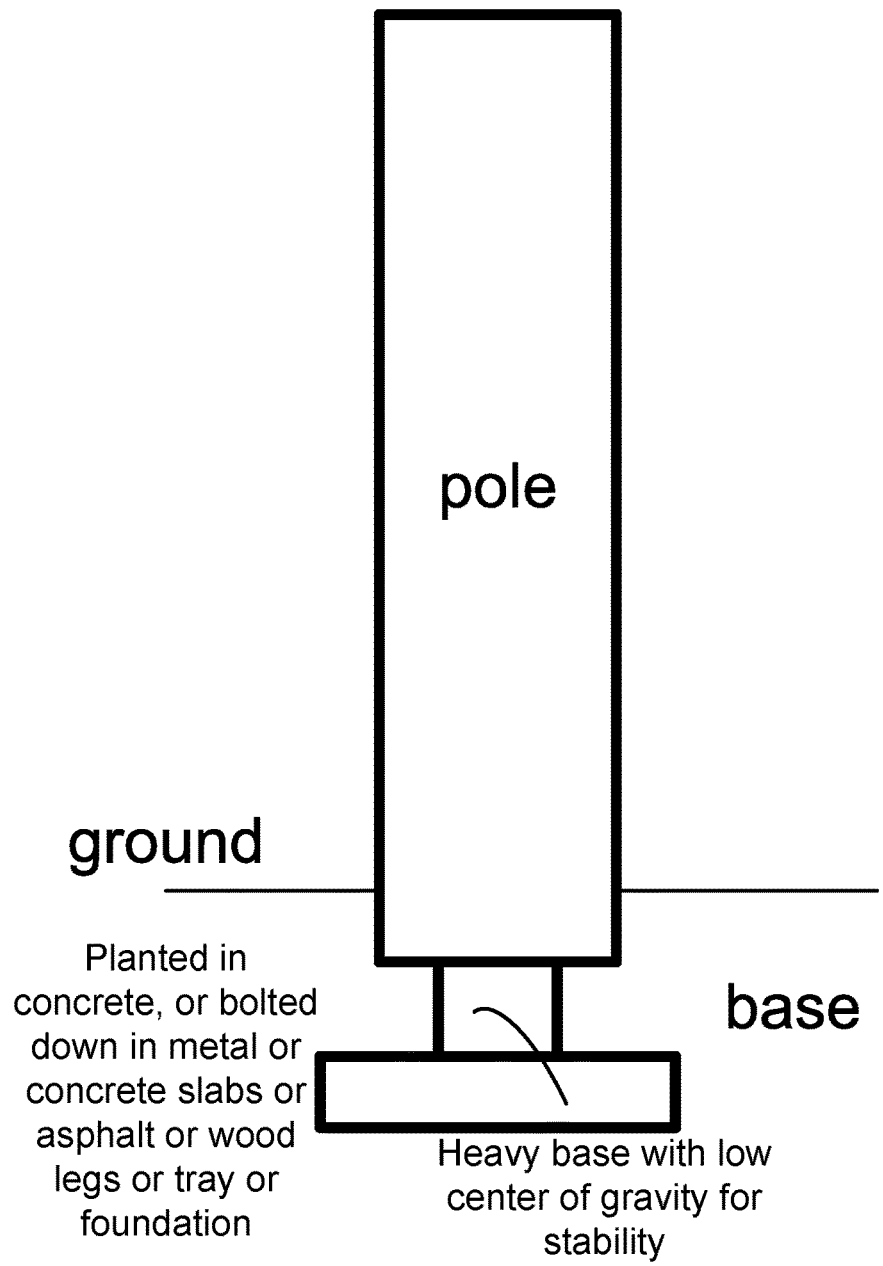

FIG. 1 is for one embodiment, as an example, for our platform system, for pole (or pipe structure or shape) with various sections and components. Also, see Appendices 1-5 for more details. FIG. 2 is for one embodiment, as an example, for our platform system, for pole installed in ground or on it or on a plate or slab or surface or structure or the like.

Figure 3:
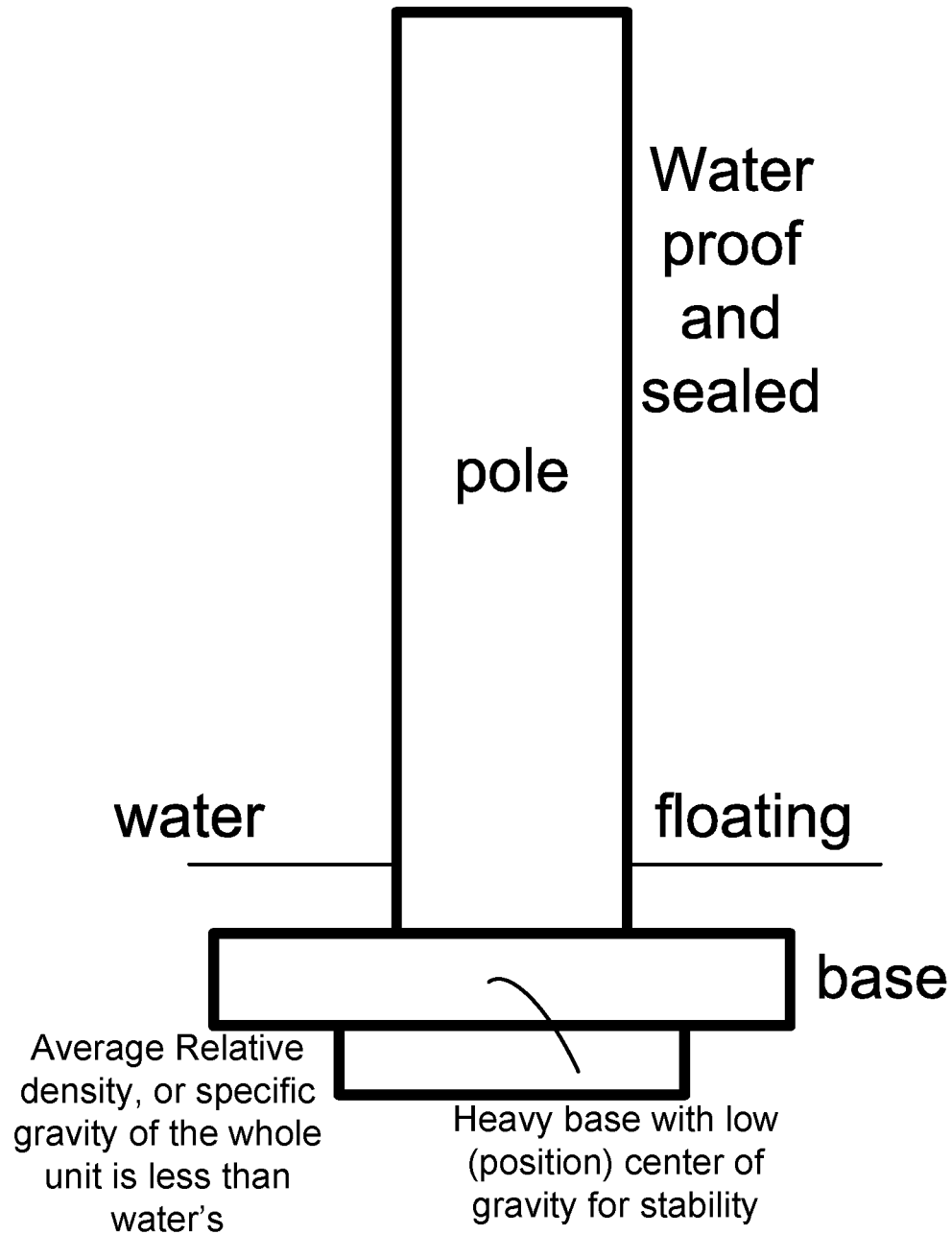
FIG. 3 is for one embodiment, as an example, for our platform system, for pole installed on water, floating on it, on a floater or small boat or wooden or plastic or fiber or metal or synthetic material container, or attached on top of it.
Figure 4:
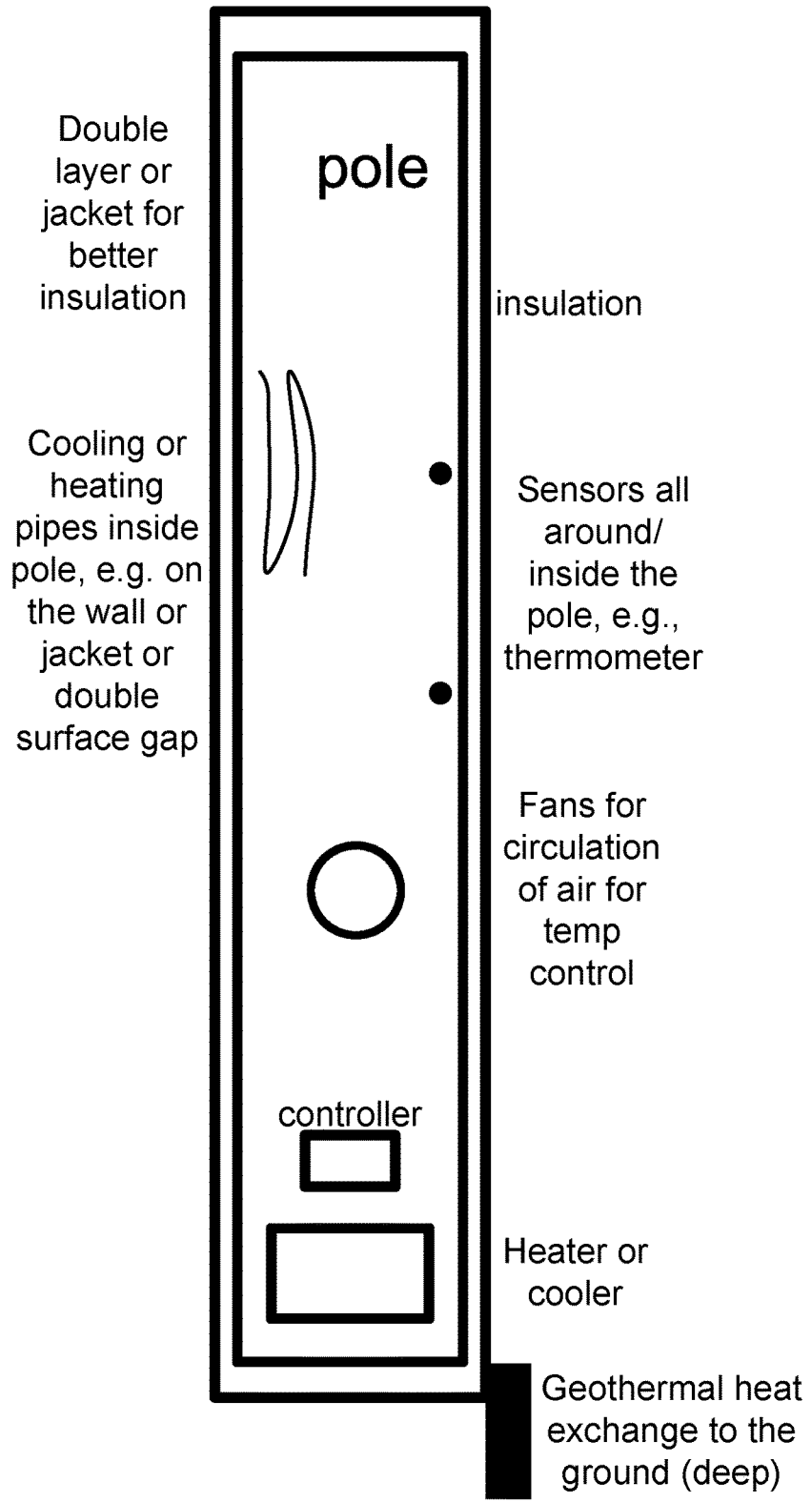
FIG. 4 is for one embodiment, as an example, for our platform system, for pole with various heating and cooling systems installed.

FIG. 3 is for one embodiment, as an example, for our platform system, for pole installed on water, floating on it, on a floater or small boat or wooden or plastic or fiber or metal or synthetic material container, or attached on top of it. FIG. 4 is for one embodiment, as an example, for our platform system, for pole with various heating and cooling systems installed.

Figure 5:
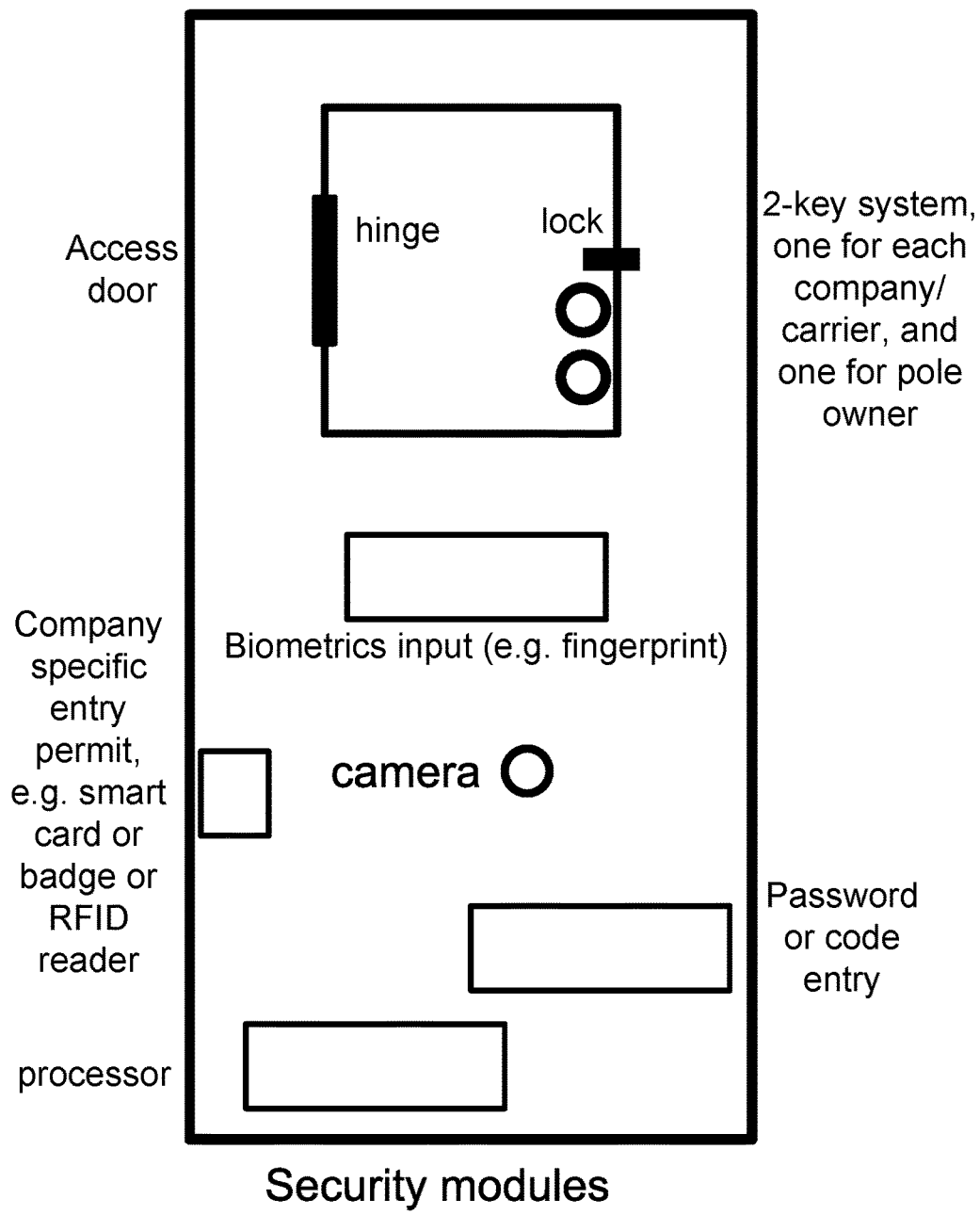
FIG. 5 is for one embodiment, as an example, for our platform system, for pole with various security systems installed.
Figure 6:
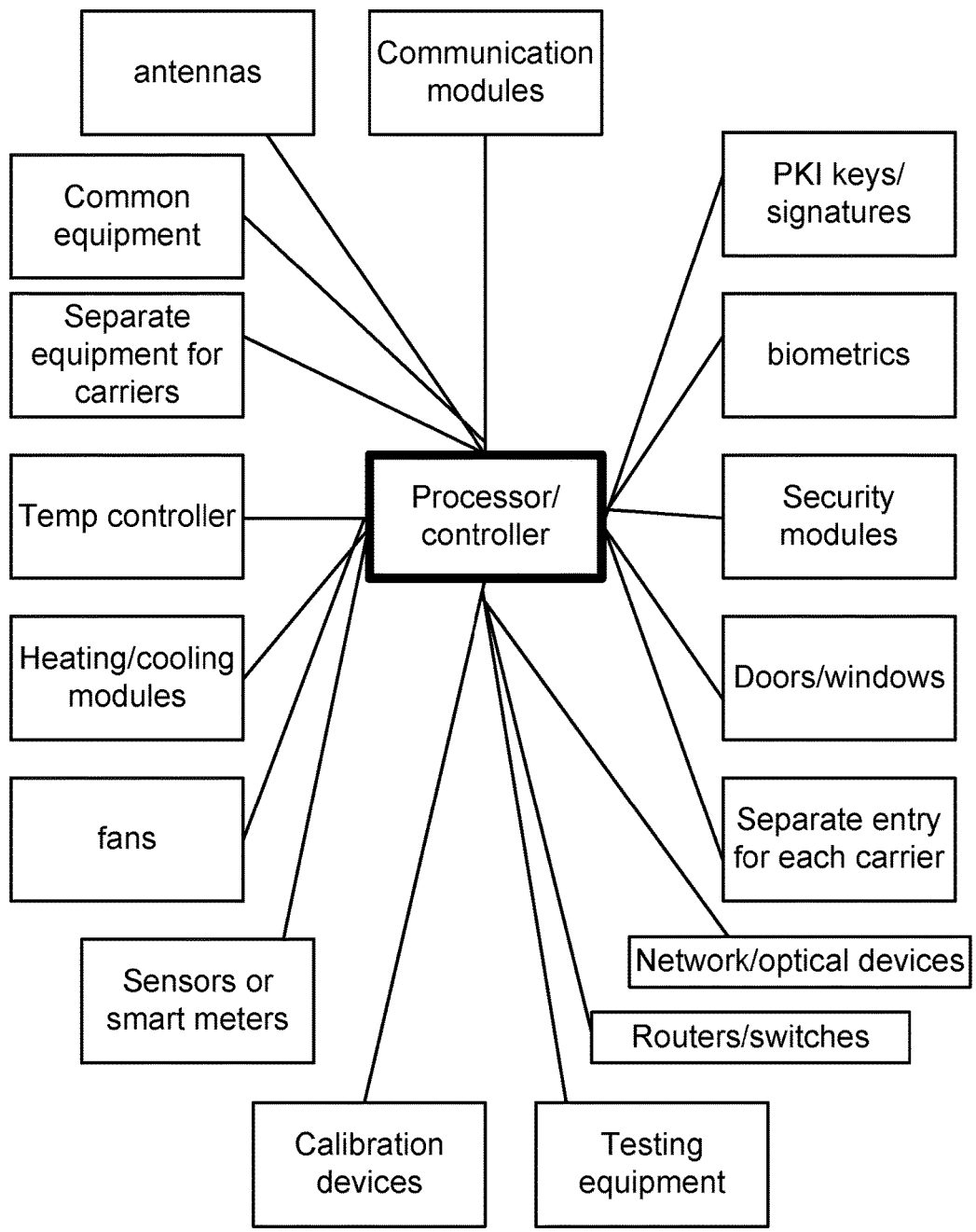
FIG. 6 is for one embodiment, as an example, for our platform system, for pole with various components or subsystems or modules.
Figure 7:
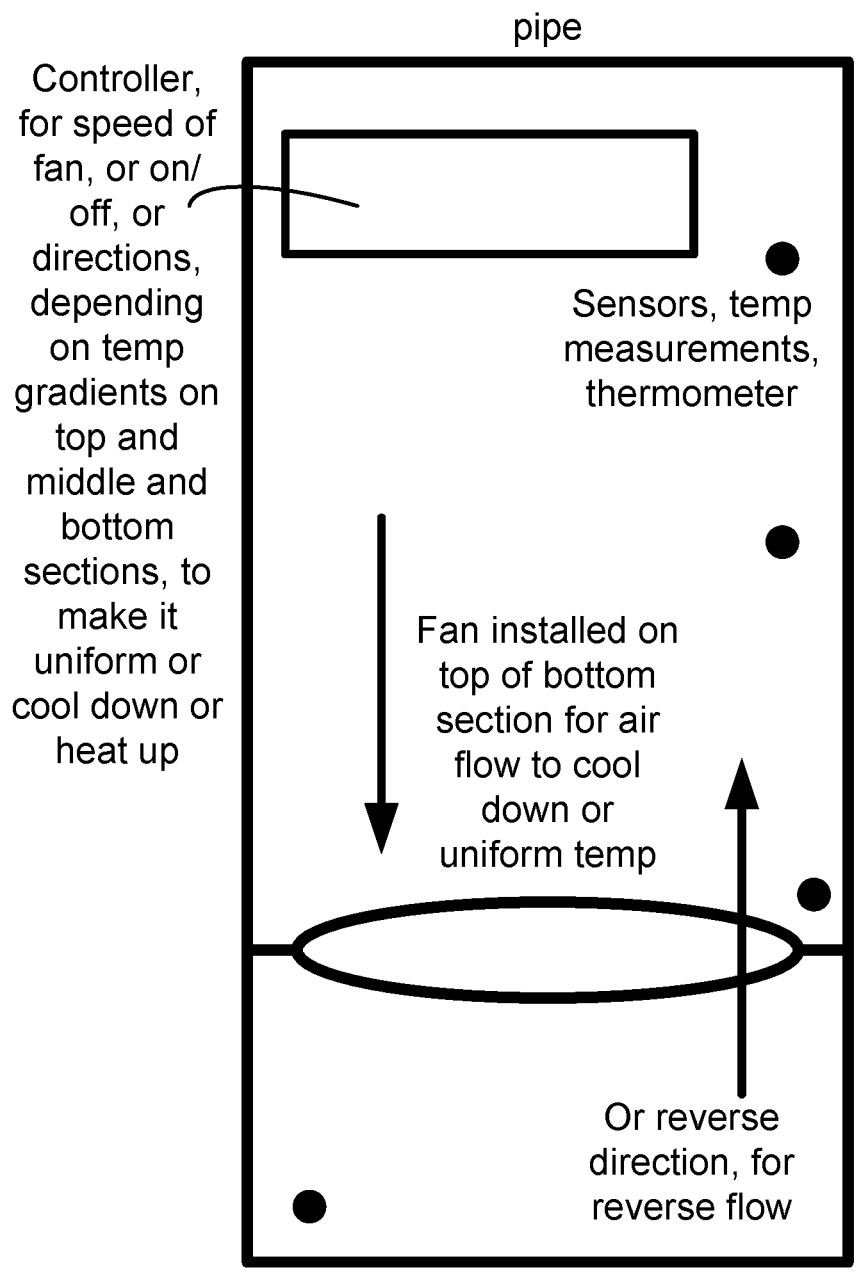
FIG. 7 is for one embodiment, as an example, for our platform system, for pole with various fan directions and speeds, with one or more fans, installed at different heights.
Figure 8:
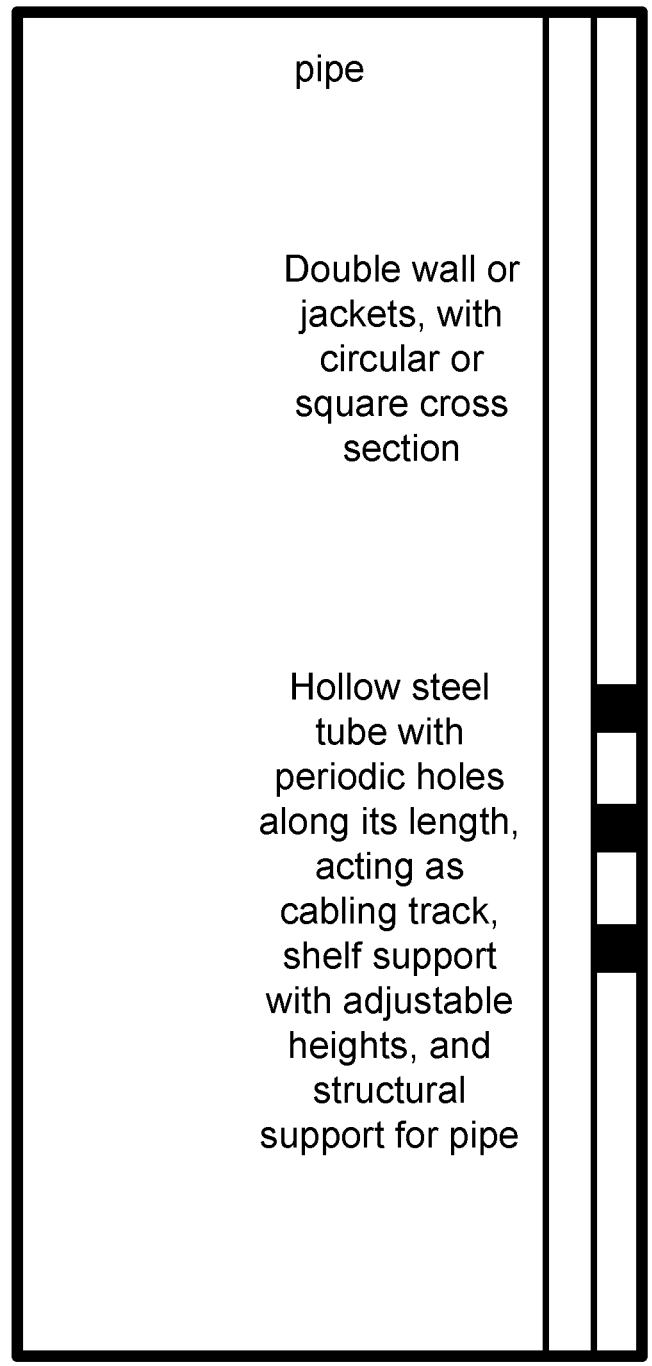
FIG. 8 is for one embodiment, as an example, for our platform system, for pole with double wall and jacket with various features for various functions.
Figure 9:
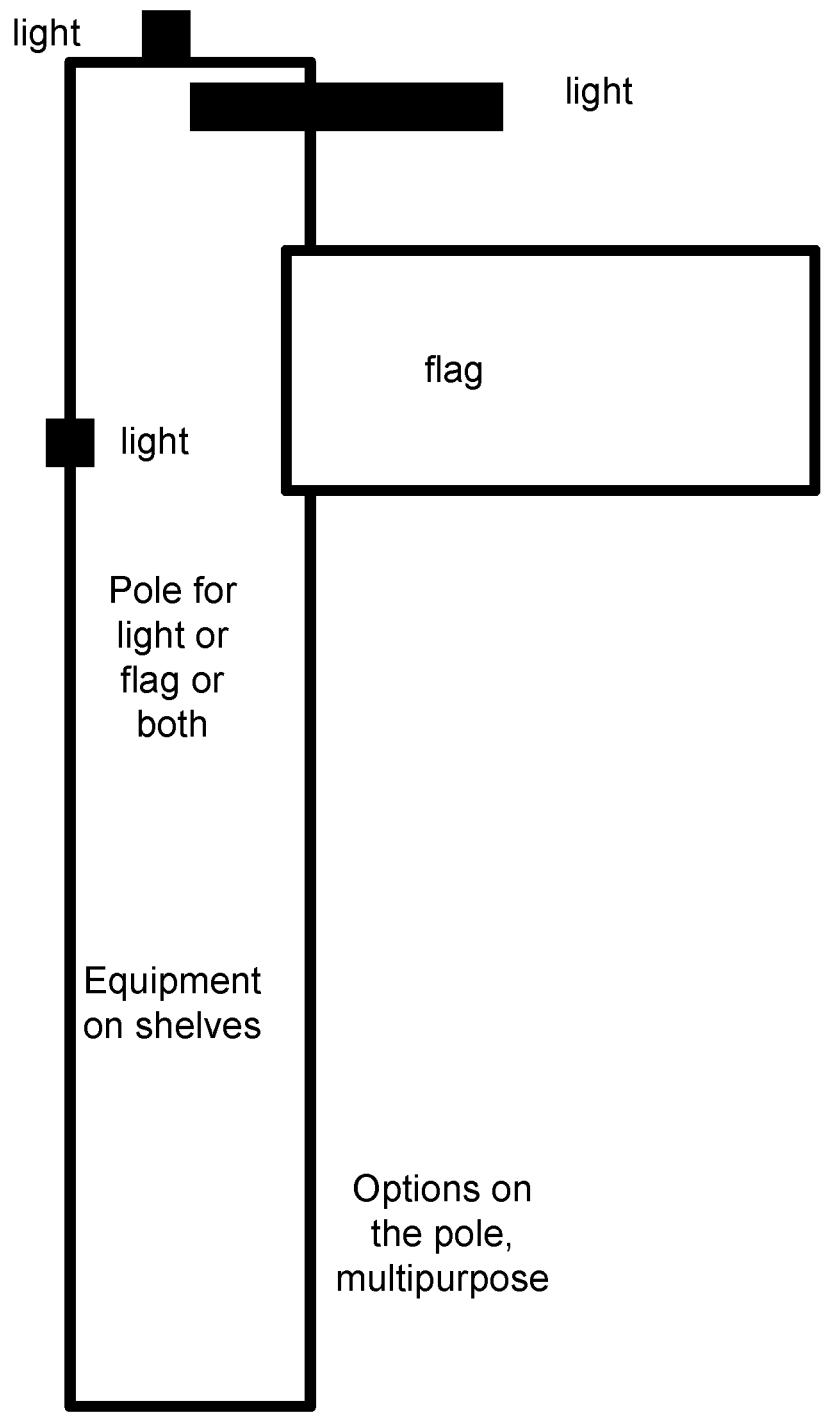
FIG. 9 is for one embodiment, as an example, for our platform system, for pole with street lighting option, and flag option.

FIG. 5 is for one embodiment, as an example, for our platform system, for pole with various security systems installed. FIG. 6 is for one embodiment, as an example, for our platform system, for pole with various components or subsystems or modules. FIG. 7 is for one embodiment, as an example, for our platform system, for pole with various fan directions and speeds, with one or more fans, installed at different heights. FIG. 8 is for one embodiment, as an example, for our platform system, for pole with double wall and jacket with various features for various functions. FIG. 9 is for one embodiment, as an example, for our platform system, for pole with street lighting option, e.g., at the top section, or attached in the middle or bottom section, and also flag option.

In one embodiment, we have the pole installed on a float or a boat near shore near city, with heavy bottom as anchor and low center of gravity, to keep the pole stable, from toppling down or falling down.

In one embodiment, we have double lock system, where both locks must be opened to open the door. In one embodiment, we have double lock system, where at least one of the locks must be opened to open the door. One lock/key/entry module belongs to specific carrier and the $2^{nd}$ one belongs to the owner of the pole (us). In one embodiment, we have a master key or master password to open the doors, in case the key or password for the carrier is lost or forgotten, for emergency situation. In one embodiment, we have physical key. In one embodiment, we have electronic key. In one embodiment, we have both types of keys. In one embodiment, we have PKI key/signature, plus biometrics, plus camera, e.g., recognizer for fingerprint, iris, eye, hand, face, signature, thumb, and the like, with database and pattern recognizer modules. In one embodiment, we have a pipe structure for the pole platform.

In one embodiment, in the top section, we have one antenna. In one embodiment, in the top section, we have more than one antennas. In one embodiment, in the top section, we have measurement equipment, or control devices, or calibration modules, or electromagnetic radiation devices or transmitters or receivers. In one embodiment, we have 27-30 ft tower or pole (as an example, for range of pole or tower heights or lengths). In one embodiment, we have lighting pole or flag pole, integrated in our pole. In one embodiment, we have metro sign or pole as self-standing structure, separate or the same as our pole. In one embodiment, we have integration with smart systems, devices, or services, or Internet of Things.

In one embodiment, we use any kind of processor or computer or server or cloud computing or Internet or app or microprocessor or smart phone or tablet to run the process or control it. In one embodiment, we any kind of antenna or any shape of antenna for various lengths for various frequencies or bands. In one embodiment, we use any material for internal or external of the pole, e.g., steel, stainless steel, Al, metal, alloy, concrete, asphalt cover, insulator, wood, treated wood, plastic, fiber, carbon, elastic material, gap fillers, synthetic materials, cloth, fabric, nylon, wool, silicone, PVC, or the like.

Any variations of the above teaching are also intended to be covered by this patent application.

The invention claimed is:

1. A system for wireless pole platform for installation in or on city, urban or rural area, building, road side, transportation station, park, or platform, said system comprising:
   a top section;
   a middle section;
   a bottom section;
   wherein said middle section comprises shelves or attachments containing or holding equipment from one or more wireless carriers, with an antenna;
   wherein said bottom section comprises one or more doors and windows as access panel to various equipment for repair, testing, installation, calibration, measurements, or maintenance;
   a DC power supply outlet located inside said wireless pole platform;
   a calibration device for said various equipment in said wireless pole platform;
   a metal shield to block radio-frequency signals inside portions of said wireless pole platform;
   an anti-hacking module for said wireless pole platform;
   insulation for sound or noise, installed at wall of said wireless pole platform;
   a heating unit to heat said wireless pole platform;
   a fan unit;
   insulation for heat transfer or exchange, installed at wall of said wireless pole platform;
   a double-layer jacket inside said wireless pole platform;
   cooling and heating pipes inside said double-layer jacket;
   a controller for adjusting flow of said cooling and heating pipes inside said double-layer jacket;
   wherein said fan unit is installed at top of said bottom section;
   a geothermal exchange unit, for exchanging heat to ground, from said bottom section;
   wherein said controller adjusts said fan unit's speed and said fan unit's direction, for circulation of air within said wireless pole platform, depending on temperature gradient inside said wireless pole platform, to make temperature uniform within said wireless pole platform;
   wherein said bottom section is attached to ground for stability.

2. The system for wireless pole platform as recited in claim 1, wherein said one or more doors and windows are waterproof.

3. The system for wireless pole platform as recited in claim 1, wherein said one or more doors and windows are secured.

4. The system for wireless pole platform as recited in claim 1, wherein open or closed status of said one or more doors and windows are monitored by a center.

5. The system for wireless pole platform as recited in claim 1, wherein said one or more doors and windows are customized for private access by each carrier.

6. The system for wireless pole platform as recited in claim 1, wherein said one or more doors and windows are locked.

7. The system for wireless pole platform as recited in claim 1, wherein said one or more doors and windows are secured by biometrics modules.

8. The system for wireless pole platform as recited in claim 1, said system comprises a cooling unit.

9. The system for wireless pole platform as recited in claim 1, wherein said system is hidden from view by a stealth or camouflage decoration or paint or color or shape or material.

10. The system for wireless pole platform as recited in claim 1, said system comprises a camera.

11. The system for wireless pole platform as recited in claim 1, said system comprises a password module.

12. The system for wireless pole platform as recited in claim 1, said system comprises a warning module for pole owner or police.

13. The system for wireless pole platform as recited in claim 1, said system comprises one or more sensors.

14. The system for wireless pole platform as recited in claim 1, said system comprises a Long-Term Evolution standard device or module for high-speed wireless communication for mobile phones and data.

15. The system for wireless pole platform as recited in claim 1, said system comprises a Wireless Fidelity networking technology device or module.

16. The system for wireless pole platform as recited in claim 1, said system comprises a smart device, module, or service.

17. The system for wireless pole platform as recited in claim 1, said system comprises or is connected to or integrated with an Internet-of-Things device or module.

* * * * *